(12) United States Patent
Ramirez

(10) Patent No.: US 7,366,390 B1
(45) Date of Patent: Apr. 29, 2008

(54) FIBER OPTIC CABLE TOOL

(76) Inventor: Victor Ramirez, 12818 Thornlake Ave., Norwalk, CA (US) 90650

( * ) Notice: Subject to any disclaimer, the term of this patent is extended or adjusted under 35 U.S.C. 154(b) by 0 days.

(21) Appl. No.: 11/544,511

(22) Filed: Oct. 6, 2006

Related U.S. Application Data

(60) Provisional application No. 60/725,072, filed on Oct. 7, 2005.

(51) Int. Cl.
*G02B 6/00* (2006.01)
(52) U.S. Cl. ........................ 385/134; 385/135
(58) Field of Classification Search .................. 385/134
See application file for complete search history.

(56) References Cited

U.S. PATENT DOCUMENTS 4,693,557 A * 9/1987 Fergason ................... 349/7
4,915,470 A * 4/1990 Moore et al. .............. 385/94
5,852,697 A * 12/1998 Williams et al. ........... 385/93
7,086,892 B2 * 8/2006 Tanacan et al. ........... 439/490

* cited by examiner

*Primary Examiner*—Jennifer Doan
(74) *Attorney, Agent, or Firm*—Kenneth L Tolar

(57) ABSTRACT

A technician's tool for installing and repairing fiber optic cables includes a tubular housing having an open, substantially bell-shaped head portion at an upper end. Positioned within the housing, proximal the bell-shaped head portion, is a light source with a lens superimposed thereon. The lens is divided into a plurality of adjacent sectors whereby every other sector is transparent while each sector therebetween is discretely colored. Rotatably mounted over the lens is a receiver plate with a plurality of hollow receiver posts extending therefrom; each receiver post is adapted to connect to a fiber optic cable connector. By rotating the receiver plate, the technician can either project white light beams or discretely colored light beams through the receiver posts, depending upon the application.

4 Claims, 1 Drawing Sheet

FIBER OPTIC CABLE TOOL

CROSS REFERENCE TO RELATED APPLICATIONS

This application is entitled to the benefit of provisional application No. 60/725,072 filed on Oct. 7, 2005, the specification of which is incorporated herein by reference.

BACKGROUND OF THE INVENTION

The present invention relates to a tool for assisting a technician in identifying and repairing faulty fiber optic cable systems.

DESCRIPTION OF THE PRIOR ART

Fiber optic cables are used in a variety of telecommunications and computer networks. However, properly connecting fiber optic cables to a corresponding connection in a telecommunications network can be tedious and difficult. Furthermore, identifying faulty cables is always a challenge. Accordingly, there is currently a need for a tool that assists a technician in identifying faulty fiber optic cables. The present invention addresses this need by providing a uniquely designed tool that projects a light beam through each of a plurality of fiber optic cables to verify its light conductance. Furthermore, each light beam may be discretely colored to assist the technician with properly connecting a cable to a corresponding network component.

SUMMARY OF THE INVENTION

The present invention relates to a technician's tool for installing and repairing fiber optic cables including a tubular housing having an open, substantially bell-shaped head portion at an upper end. Positioned within the housing, proximal the bell-shaped head portion, is a light source with a lens superimposed thereon. The lens is divided into a plurality of adjacent sectors whereby every other sector is transparent while each sector therebetween is discretely colored. Rotatably mounted over the lens is a receiver plate with a plurality of hollow receiver posts extending therefrom; each receiver post is adapted to connect to a fiber optic cable. By rotating the receiver plate, a technician can either project white light beams or discretely colored light beams through the receiver posts, depending upon the application.

It is therefore an object of the present invention to provide a technician's tool that allows a technician to readily identify faulty fiber optic cables.

It is another object of the present invention to provide a tool that assists a technician in properly installing fiber optic cables.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 2:
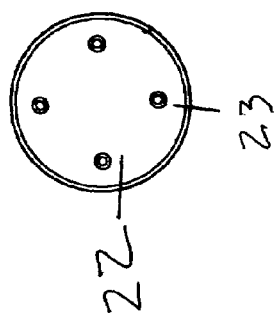
FIG. 2 is a top, plan view of the receiver plate.
Figure 4:
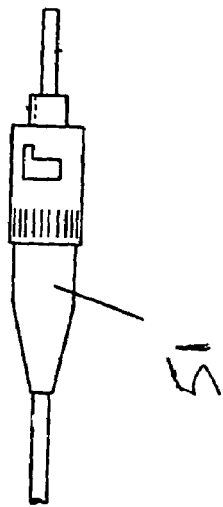
FIG. 4 depicts a typical ST style fiber optic cable connector.
Figure 1:
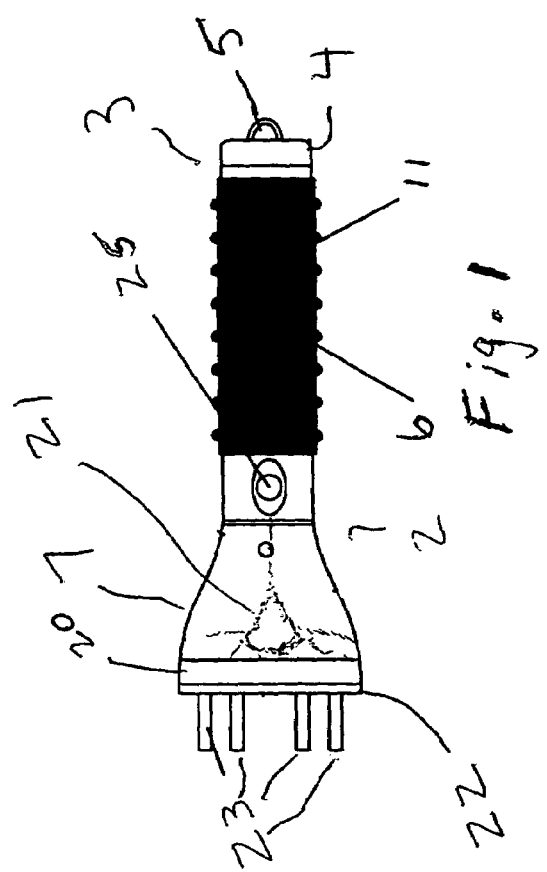
FIG. 1 is a side, plan view of the tool according to the present invention.

The present invention relates to a fiber optic cable tool. The device comprises an elongated tubular handle 1 having an upper end 2 and a lower end 3. At the lower end is removable cap 4 with a hook 5 attached thereto that provides selective access to an interior battery compartment. Around the exterior of the handle is a rubber coated hand grip 6 having protrusions formed thereon 11 that provide a frictional surface for a user to grasp.

Figure 3:
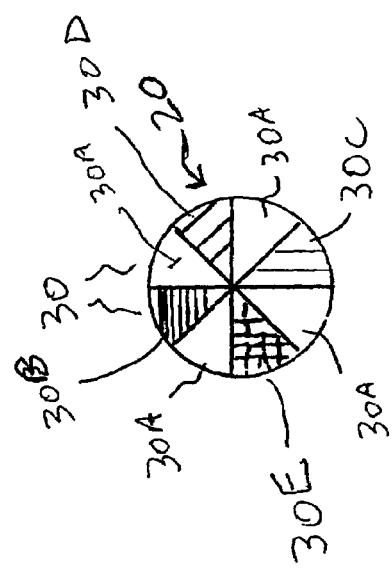
FIG. 3 is a top view of the lens.

At the upper end of the handle is an open, bell-shaped head portion 7 with a lens 20 mounted thereon. Positioned within the housing, behind the lens, is a light source 21 such as a flashlight type lightbulb that is activated by a switch 25. The lens is divided into a plurality of adjacent sectors 30 whereby every other sector is transparent while each sector therebetween is discretely colored. As depicted in FIG. 3, the lens could have, for example, four transparent sectors 30A, and one blue 30B, one red 30C, one green 30D and one amber sector 30E.

Rotatably mounted over the lens is a receiver plate 22 with a plurality of hollow receiver posts 23 extending therefrom, each adapted to mate with a fiber optic cable connector 51. The receiver posts are oriented such that they all either align with the transparent or colored sectors, but not a combination of both. By rotating the receiver plate, a user can either project white light beams or multiple, discretely colored light beams through the receiver posts, depending upon the application.

If a technician wishes to properly install fiber optic cables, he or she activates the light source and rotates the receiver disc until a discretely colored light beam is projected through each of the receiver posts. Then, the technician connects each of a plurality of fiber optic cables to one of the receivers. Accordingly, the discretely colored beam projected through each cable assists the technician in properly securing the terminus of the cable to a corresponding segment of the communications system.

If the technician wishes to identify faulty fiber optic cables, he or she rotates the receiver disc until white light beams are projected through each of the receiver posts and the cables are connected thereto. Accordingly, any properly operating fiber optic cables will be light conductive such that their terminuses will be illuminated. Any cable having an unilluminated terminus can be readily identified as faulty.

The receiver posts are each configured to securely mate with an ST, SC, LC or any other conventional fiber optic cable connectors. The above described device is not limited to the exact details of construction and enumeration of parts provided herein. Though the drawings depict four receiver posts that align with four of eight possible sectors, the number of posts and sectors can be varied. Furthermore, the size, shape, number and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A fiberoptic cable tool comprising:

an elongated tubular handle having an upper end and a lower end;

a lens mounted on the upper end of said handle, said lens divided into a plurality of adjacent sectors, every other sector being transparent while each sector therebetween is discretely colored;

a light source positioned within a housing, adjacent the lens;

a receiver plate rotatably mounted over the lens, said plate having a plurality of hollow receiver posts extending therefrom, each post adapted for connection to a fiber optic cable.

2. The fiberoptic cable tool according to claim 1 further comprising a removable cap at the lower end of the housing with a hook attached thereto, said cap providing selective access to an interior battery compartment.

3. The fiberoptic cable tool according to claim 2 further comprising a rubber coated hand grip encompassing the handle, said handgrip having protrusions formed thereon that provide a frictional surface for a user to grasp.

4. The fiberoptic cable tool according to claim 1 wherein said receiver posts are oriented such that they all simultaneously align with either of said every other sector and said each sector therebetween.

* * * * *